(12) United States Patent
Tashiro et al.

(10) Patent No.: US 9,784,119 B2
(45) Date of Patent: Oct. 10, 2017

(54) OPENING DEGREE REGULATING STRUCTURE FOR VARIABLE NOZZLE MECHANISM AND VARIABLE DISPLACEMENT TURBOCHARGER

(75) Inventors: Naoto Tashiro, Tokyo (JP); Yasuaki Jinnai, Tokyo (JP); Hiroyuki Arimizu, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 815 days.

(21) Appl. No.: 14/232,515

(22) PCT Filed: Sep. 7, 2012

(86) PCT No.: PCT/JP2012/072887
§ 371 (c)(1),
(2), (4) Date: Feb. 6, 2014

(87) PCT Pub. No.: WO2013/047153
PCT Pub. Date: Apr. 4, 2013

(65) Prior Publication Data
US 2014/0178181 A1    Jun. 26, 2014

(30) Foreign Application Priority Data

Sep. 28, 2011    (JP) ................ 2011-213559

(51) Int. Cl.
*F01D 17/16*    (2006.01)
*F02B 37/24*    (2006.01)
*F02B 37/04*    (2006.01)

(52) U.S. Cl.
CPC ........... *F01D 17/165* (2013.01); *F02B 37/04* (2013.01); *F02B 37/24* (2013.01);
(Continued)

(58) Field of Classification Search
CPC ........................... F01D 17/165; F01D 17/16
See application file for complete search history.

(56) References Cited

U.S. PATENT DOCUMENTS 6,659,718 B2 * 12/2003 Jinnai ............... F01D 17/165
29/889.22
7,097,432 B1    8/2006 Lombard et al.
(Continued)

FOREIGN PATENT DOCUMENTS

CN    1307171 A    8/2001
CN    1454284 A    11/2003
(Continued)

OTHER PUBLICATIONS

Decision to Grant a Patent effective Jul. 21, 2016 issued in the corresponding EP Application No. 12836744.8.
(Continued)

*Primary Examiner* — Gregory Anderson
*Assistant Examiner* — Juan G Flores
(74) *Attorney, Agent, or Firm* — Birch, Stewart, Kolasch & Birch, LLP

(57) ABSTRACT

It is provided with: a variable nozzle mechanism section 23; an opening degree regulating member 43 for regulating an angle of a nozzle vane 19a by bringing an outer peripheral surface 41 of an inner cylinder of a bearing housing 13 to which a nozzle mount is affixed and an inner peripheral surface of a lever plate 33 into contact; and a discharge recess 47 for discharging soot which accumulates in the gap between an inner peripheral end portion of the lever plate 33, the nozzle mount 21, and the bearing housing 13 to the inner peripheral end portion of the lever plate 33.

3 Claims, 5 Drawing Sheets

(52) U.S. Cl.
CPC .... *F05D 2220/40* (2013.01); *F05D 2260/607* (2013.01); *Y02T 10/144* (2013.01)

(56) References Cited

U.S. PATENT DOCUMENTS

| | | | | |
|---|---|---|---|---|
| 7,396,204 B2* | 7/2008 | Shiraishi | ............... | F01D 17/165 29/889.2 |
| 2001/0017032 A1 | 8/2001 | Jinnai | | |
| 2008/0035112 A1 | 2/2008 | Yamaguchi et al. | | |

FOREIGN PATENT DOCUMENTS

| | | | | | |
|---|---|---|---|---|---|
| FR | WO 2006015613 A1 | * | 2/2006 | ........... | F01D 17/165 |
| JP | 2000-199433 A | | 7/2000 | | |
| JP | 2002-256877 A | | 9/2002 | | |
| JP | 2002-256879 A | | 9/2002 | | |
| JP | 2002256877 A | * | 9/2002 | | |
| JP | 2005-48602 A | | 2/2005 | | |
| JP | 2006-105017 A | | 4/2006 | | |
| JP | 2009-257090 A | | 11/2009 | | |
| JP | 2011-106276 A | | 6/2011 | | |
| WO | WO 2006/015613 A1 | | 2/2006 | | |
| WO | WO 2006/038599 A1 | | 4/2006 | | |

OTHER PUBLICATIONS

Notice of Allowance effective Jul. 28, 2016 issued in the corresponding Chinese Application No. 201280033917.0 with an English Translation.

Chinese Office Action and Search Report, issued Jul. 1, 2015, for Chinese Application No. 201280033917.0, along with English translations of the Chinese Office Action and Search Report.

Extended European Search Report, issued May 18, 2015, for European Application No. 12836744.8.

International Preliminary Report on Patentability for PCT/JP2012/072887 dated Apr. 10, 2014 and an English translation.

International Search Report for PCT/JP2012/072887 dated Sep. 7, 2012.

Japanese Notice of Allowance for related Application No. JP 2011-213559 dated Sep. 30, 2013 and an English translation.

* cited by examiner

Related Art

OPENING DEGREE REGULATING STRUCTURE FOR VARIABLE NOZZLE MECHANISM AND VARIABLE DISPLACEMENT TURBOCHARGER

TECHNICAL FIELD

The present invention relates to a variable displacement turbocharger equipped with a variable nozzle mechanism which is configured to vary an angle of a plurality of nozzle vanes, and in particular to an opening degree regulating structure for a variable nozzle mechanism and a variable displacement turbocharger equipped with the opening degree regulating structure, in which opening and closing operation and opening degree regulation of the variable nozzle mechanism is not adversely affected by deposition of soot in exhaust gas from an engine.

BACKGROUND ART

For relatively small exhaust turbochargers to be used in an internal combustion engine for vehicles, etc., exhaust gas from the engine, adopted is the configuration in which exhaust gas from the engine fills a scroll formed in a turbine housing, and passes through a plurality of nozzle vanes provided on an inner circumferential side of the scroll to act on a turbine rotor provided on an inner circumferential side of the plurality of nozzle vanes.

Further, a variable displacement turbocharger equipped with a variable nozzle mechanism which is configured to vary an angle of a plurality of nozzle vanes is often used.

This variable nozzle mechanism is configured to vary the angle of the nozzle vane, and a full close position (the minimum use opening position) or a full open position (the maximum use opening position) of the nozzle vane is set from the perspective of safety and required performance of a turbocharger. The full open position or full close position is normally regulated by a stopper mechanism.

One example of the stopper mechanism is described in Patent Document 1 (JP 2000-199433 A). According Patent Document 1, a roller pin member serving as a stopper pin is configured to control the full open angle of the nozzle vane by bringing a large-diameter disk part of the roller pin member into contact with a side face of one of adjacent two opening-closing levers which are disposed on both sides of the roller pin member and control the full close angle of the nozzle vane by bringing the large-diameter disk part of the roller pin member into contact with a side face of the other of the adjacent two opening-closing levers.

Further, described in Patent Document 2 (JP 2002-256877 A) is to control a vane angle without providing a stopper pin. As illustrated in FIG. 9 of the attached drawings, a variable nozzle mechanism for a variable capacity turbine is configured such that two full-opening stopper surfaces 03 are provided on at least two neighboring lever plates 01 to move nozzle vanes toward the opening direction and stop the nozzle vanes at the full-opening position by contacting the two neighboring lever plates to each other and a closing stopper surface 07 is provided on each of the lever plate 01 and the nozzle mount 05 to stop the nozzle vanes at the minimum opening angle position by contacting the closing stopper surfaces 07 to each other at the minimum opening angle position of the nozzle vanes.

CITATION DOCUMENT

Patent Document

[Patent Document]1
JP 2000-199433 A

[Patent Document]2
JP 2002-256877 A

SUMMARY

Technical Problem

However, by providing a stopper pin to determine the fully closed and fully opened of the nozzle vane opening degree and contact the opening-closing lever to the pin as shown in Patent Document 1, there are following issues. Accuracy in a fixed position of the stopper pin is required, the regulated opening degree is likely to change due to wear of links in contact with the stopper pin, and when there is wear of a lever and a link which are not in contact with the stopper pin, the regulated opening degree is likely to change.

Moreover, in those that do not use a stopper pin as in Patent Document 2, although not easily affected by wear of the pin and the required positioning accuracy of the stopper pin, soot in the exhaust gas accumulates in the bearing housing due to the leaked exhaust gas from an exhaust gas passage inside the variable displacement turbocharger. This accumulated soot adversely affects operation of the opening-closing lever and hence causes the change in the regulated opening position.

Specifically, as shown in FIG. 9, soot is easily accumulated in places such as a gap between a side surface of the nozzle mount 05 and a rear surface of the lever plate 01 and between an inner circumferential end face of the lever plate 01 and the nozzle mount side step-shape stopper surface 07 of the nozzle mount 05. This accumulated soot can impair smooth movement of the opening-closing lever and further cause deviations in the regulated angle.

Therefore, the present invention has been made in view of the above issues, and it is an object of the present invention to provide an opening degree regulating structure for a variable nozzle mechanism and a variable displacement turbocharger equipped with the opening degree regulating structure, which is not easily affected by deposition of soot in the exhaust gas and by which the opening degree of the nozzle vane is reliably regulated Solution to Problem To achieve the above object, according to the present invention, an opening degree regulating structure for a variable nozzle mechanism comprises:

the variable nozzle mechanism which comprises: a plurality of variable nozzle vanes arranged along a circumferential direction of a turbine and having nozzle shafts that are rotatably supported by a nozzle mount, the nozzle mount being fixed in a housing; an annular nozzle drive member which is configured to be rotatable around an axis of the turbine by an actuator so as to rotate the nozzle shafts of the nozzle vanes; and connecting members which are equal in number to the nozzle vanes, the connecting members connecting the nozzle shafts of the nozzle vanes to the nozzle drive member and being configured to be pivotable by the nozzle drive member so as to rotate the nozzle shafts;

an opening degree regulating part which is configured to regulate an angle of the nozzle vane by contacting an outer peripheral surface of an inner cylinder of the housing and an inner peripheral end surface of the connecting member to each other, the nozzle mount being fixed to the inner cylinder of the housing; and a discharge part formed in at least one of an inner peripheral end portion of the connecting member, the nozzle mount or the housing in a vicinity of the opening degree regulating part so as to discharge soot accumulating in a gap between the inner peripheral end portion of the connecting member and at least one of the nozzle mount and the housing.

According to the present invention, the opening degree regulating part is configured to regulate an angle of the nozzle vane by contacting an outer peripheral surface of an inner cylinder of the housing and an inner peripheral end surface of the connecting member to each other, and the discharge part is formed in at least one of the inner peripheral end portion of the connecting member, the nozzle mount or the housing so as to discharge soot accumulating in a gap between the inner peripheral end portion of the connecting member and at least one of the nozzle mount and the housing. Thus, soot in the exhaust gas is unlikely to accumulate in the gap between the inner peripheral end portion of the connecting member and at least one of the nozzle mount and the housing.

As a result, without being adversely affected by the soot accumulation, the opening degree (full open and full close) of the nozzle vane can be reliably regulated with high accuracy.

It is preferable in the present invention that the discharge part is constituted by a discharge recess formed in the inner peripheral end surface of the connecting member, the discharge recess being configured to discharge accumulated soot by the inner peripheral end surface of the connecting member at rotation of the connecting member in a direction of contacting the housing.

With this configuration, soot accumulating in the gap between the inner peripheral end surface of the connecting member and the outer peripheral surface of the inner cylinder of the housing is swept out or pushed out for discharge. Thus, it is possible to effectively prevent accumulation of soot in the gap between the inner peripheral end surface of the connecting member and the outer peripheral surface of the inner cylinder of the housing.

It is also preferable in the present invention that the discharge part is constituted by a discharge groove formed along the circumferential direction in the outer peripheral surface of the inner cylinder of the housing on an inner peripheral side of a gap between the connecting member and the nozzle mount.

With this configuration, soot accumulating in the gap between the nozzle mount and the side surface of the inner peripheral end portion of the connecting member on the nozzle mount side is discharged in the circumferential direction of the turbine by means of the discharge groove. Thus, it is possible to effectively prevent accumulation of soot in the gap between the inner peripheral end surface of the connecting member and the outer peripheral surface of the inner cylinder of the housing.

It is also preferable in the present invention that the discharge groove extends in the circumferential direction of the turbine over an area larger than a contact surface of the inner peripheral end portion of the connecting member, and extends in an axial direction of the turbine to a substantially half position of the contact surface of the inner peripheral end portion of the connecting member.

With this configuration, soot accumulating in the gap between the nozzle mount and the side surface of the inner peripheral end portion of the connecting member on the nozzle mount side is discharged in the circumferential direction of the turbine by means of the discharge groove, and the soot is also discharged easily in the axial direction of the turbine by means of the discharge groove. Thus, it is possible to effectively prevent accumulation of soot in the gap between the inner peripheral end surface of the connecting member and the outer peripheral surface of the inner cylinder of the housing.

It is also preferable in the present invention that the discharge part is constituted by a thin-plate part formed in a contact section of the inner peripheral end portion of the connecting member with a thickness smaller than that of other section of the inner peripheral end portion of the connecting member.

With this configuration, soot accumulating in the gap between the nozzle mount and the side surface of the inner peripheral end portion of the connecting member on the nozzle mount side is effectively discharged in the axial direction of the turbine. Thus, it is possible to effectively prevent accumulation of soot in the gap between the inner peripheral end surface of the connecting member and the outer peripheral surface of the inner cylinder of the housing. In addition to this, as the thin-plate part has a small contact area, soot does not accumulate easily.

Moreover, according to the present invention, a variable displacement turbocharger comprises the above described opening degree regulating structure for the variable nozzle mechanism.

With this configuration, in the variable nozzle mechanism comprising the opening degree regulating part which is configured to regulate an angle of the nozzle vane by contacting an outer peripheral surface of an inner cylinder of the housing and an inner peripheral end surface of the connecting member to each other, soot in the exhaust gas is unlikely to accumulate in the gap between the inner peripheral end portion of the connecting member and at least one of the nozzle mount and the housing. As a result, it is possible to obtain the variable displacement turbocharger in which the opening degree (full open and full close) of the nozzle vane can be reliably regulated with high accuracy without being adversely affected by the soot accumulation.

Advantageous Effects

According to the present invention, the opening degree regulating part is configured to regulate an angle of the nozzle vane by contacting an outer peripheral surface of an inner cylinder of the housing and an inner peripheral end surface of the connecting member to each other, and the discharge part is formed in at least one of the inner peripheral end portion of the connecting member, the nozzle mount or the housing so as to discharge soot accumulating in a gap between the inner peripheral end portion of the connecting member and at least one of the nozzle mount and the housing. Thus, it is possible to prevent soot in the exhaust gas from accumulating in the gap between the inner peripheral end portion of the connecting member and at least one of the nozzle mount and the housing.

As a result, without being adversely affected by the soot accumulation, the opening degree (full open and full close) of the nozzle vane can be reliably regulated with high accuracy.

DETAILED DESCRIPTION

Embodiments of the present invention will now be described in detail with reference to the accompanying drawings. It is intended, however, that unless particularly specified, dimensions, materials, shapes, relative positions and the like of components described in the embodiments shall be interpreted as illustrative only and not limitative of the scope of the present invention.

(First Embodiment)

A first embodiment of the present invention is described in reference to FIG. 1 to FIG. 4.

Figure 1:
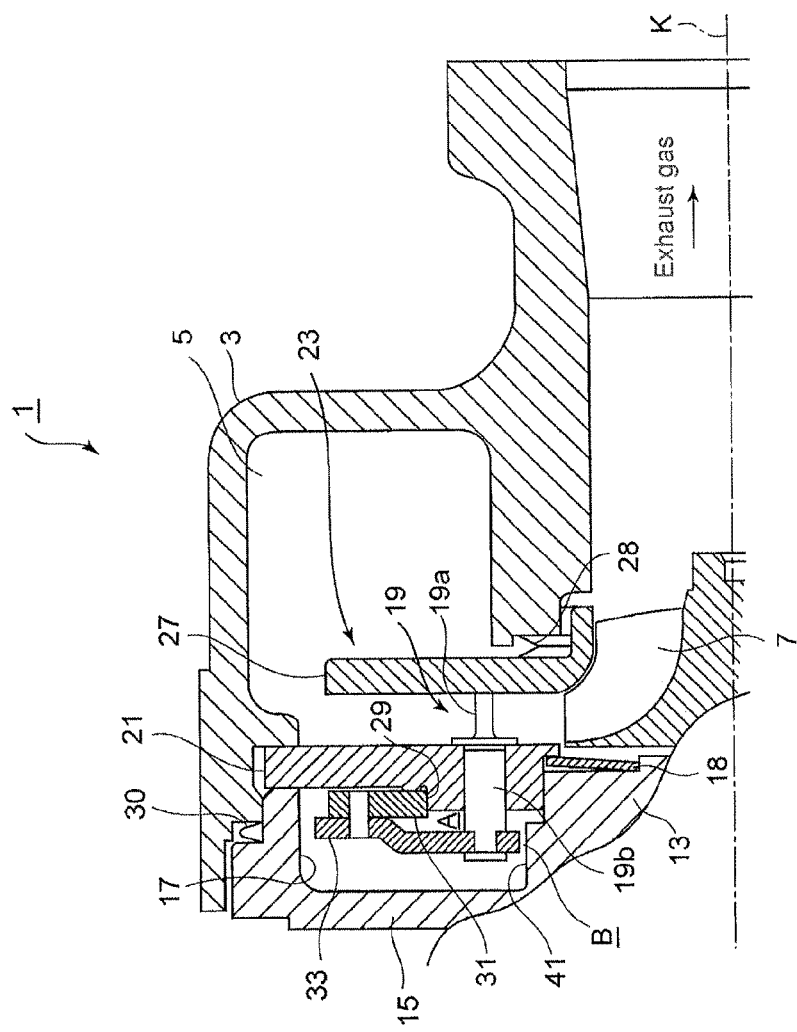
FIG. 1 is a cross-sectional view of a main part of an overall structure of a variable displacement turbocharger, illustrating a first embodiment of the present invention.

FIG. 1 is an illustration of one example of a variable displacement exhaust turbocharger (hereinafter described as exhaust turbocharger). This is a partial cross-sectional view of the exhaust turbocharger along a rotation axis and shows only an upper half of the exhaust turbocharger from the rotation axis.

As illustrated in FIG. 1, in an exhaust turbocharger 1, a thick-wall tubular turbine housing 3 is provided. In an outer peripheral part of the turbine housing 3 on an upstream side, a scroll 5 of a scroll shape is formed. Meanwhile, in an inner peripheral part of the turbine housing 3 on an upstream side, a turbine rotor 7 of a radial flow type is provided.

A turbine shaft (not shown) to which the turbine rotor 7 is mounted has a rotation center which is the rotation axis K in the drawing. On the other side of the exhaust turbocharger 1 from the turbine rotor 7, a compressor is provided. Further, the turbine shaft is rotatably supported by a bearing housing 13 via a bearing (not shown).

On a back side 15 of the bearing housing 13, an annular recess 17 is formed. In this recess 17, a variable nozzle mechanism section 23 is housed. The variable nozzle mechanism section 23 is a nozzle assembly comprising a nozzle 19, a nozzle mount 21, etc.

Further, between the back side of the turbine rotor 7 of a radial flow type and the bearing housing 13, a turbine back plate 18 is provided to prevent exhaust gas flowing through the turbine rotor 7 from leaking toward the recess 17 side of the bearing housing 13 and also to insulate heat.

A plurality of the nozzles 19 is provided at equal intervals around the rotation axis K and is disposed on an inner peripheral side of the scroll 5 in the radial direction of the turbine.

Further, the nozzle 19 comprises a nozzle vane 19a and a nozzle shaft 19b. The nozzle shaft 19b is rotatably supported by the nozzle mount 21 which is fixed to the bearing housing 13. A plurality of supports for the nozzle shafts 19b is arranged at equal intervals around the rotation axis K. By this variable nozzle mechanism section 23, an angle of the nozzle vane 19a can be changed.

The nozzle vane 19a is arranged between the nozzle mount 21 and an annular nozzle plate 27. The annular nozzle plate 27 is connected to the nozzle mount 21 by a nozzle support (not shown) to oppose the nozzle mount 21 with a set distance in the axial direction of the turbine. The nozzle plate 27 is engaged to a tip side of an inner cylinder of the turbine housing 3. Further, a seal ring 28 is arranged in an engagement section of the inner cylinder tip of the turbine housing 3, and a seal ring 30 is arranged in an engagement part of the bearing housing 13 and the turbine housing 3.

Figure 2:
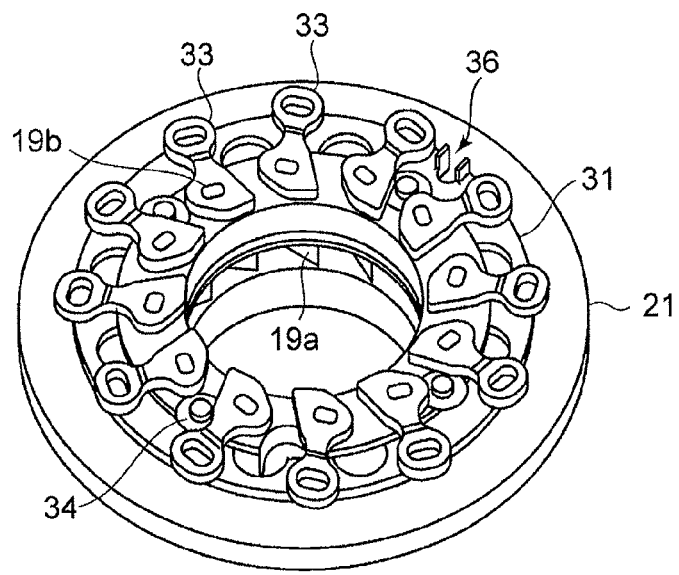
FIG. 2 is an oblique illustration of an overall structure of a variable nozzle mechanism section of the first embodiment.
Figure 3:
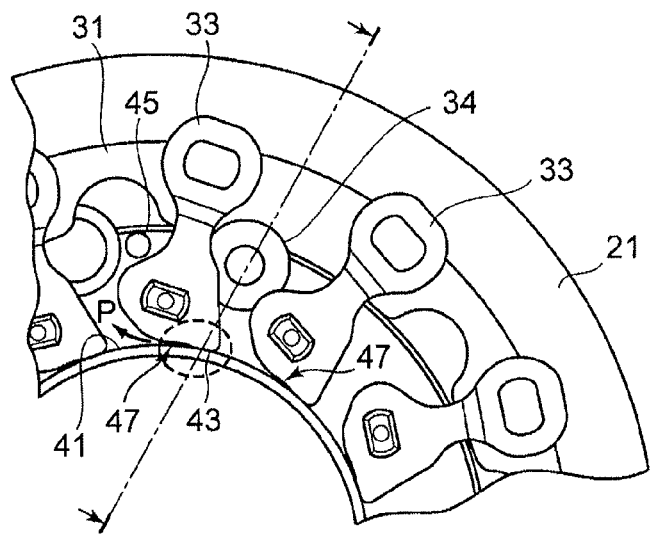
FIG. 3 is an enlarged view of a main section of FIG. 2.

The nozzle mount 1 has a stepped portion 29. To this stepped portion 29, the annular drive ring 31 is fitted rotatably around the same axis as the rotation axis K. On the drive ring 31, a plurality of gourd-shaped lever plates 33 is arranged in the circumferential direction and engages with the drive ring 31 as illustrated in FIG. 2 and FIG. 3. One end of this lever plate 33 is attached to the drive ring 31 and other end of this lever plate 33 is connected to an end of the nozzle shaft 19b which penetrates the inside of the nozzle mount 21 in the direction coinciding with the rotation axis K.

In accordance with a rotation angle of the drive ring 31 rotating around the rotation axis K, the nozzle shaft 19b rotates, thereby rotating the nozzle vane 19a in accordance with the angle. Specifically, an opening degree of the nozzle 19 can be adjusted by rotating the drive ring 31. Herein, twelve nozzle vanes 19a are arranged in the circumferential direction, and corresponding to these twelve nozzle vanes 19a, twelve lever plates 33 are arranged around the rotation axis K.

A rivet 34 (see FIG. 3) is provided slightly lower (nearer to the center) than the stepped portion 29 of the nozzle mount 21 to which the drive ring 31 is provided. This rivet 34 is configured to retain the annular inner peripheral portion of the drive ring 31 by means of a flange head of the rivet 34 so that the drive ring 31 does not fall off from the stepped portion 29.

The nozzles 19 (19a, 19b), the nozzle mount 21, the nozzle plate 27, the drive ring 31 and the lever plates 33 that are described above are assembled to constitute the variable nozzle mechanism section 23.

Further, a rotation shaft of the link mechanism (not shown) penetrating the back side 15 of the bearing housing 13 is provided. This rotation shaft is coupled to an engagement portion 36 (see FIG. 2) of the drive ring 31 so as to transmit the rotational force generated by converting reciprocal displacement from the actuator into rotational displacement.

The operation of the exhaust turbocharger 1 which is configured in the above described manner is as follows. The exhaust gas from the engine enters the scroll 5, flows around along a swirl of the scroll 5 and flows through the nozzle vanes 19a. Then, this exhaust gas passing between the nozzle vanes 19a flows into the turbine rotor 7 from the outer peripheral side, flows in the radial direction toward the center to perform expansion work to the turbine rotor 7 and then flows in the axial direction toward a gas outlet to be discharged to the outside.

To control displacement of the exhaust turbocharger 1, a vane angel of the nozzle vane 19a is set to an angle that achieves a prescribed flow rate of the exhaust gas flowing through the nozzle vanes 19a, and the vane angle is changed by an vane angle regulating part (not shown). The reciprocal displacement of the actuator corresponding to this vane angle is transmitted to the drive ring 31 to rotate the drive ring 31. By rotation of the drive ring 31, the lever plate 33 rotates, thereby rotating the nozzle shaft 19b fixed to the other end of the lever plate 33. This rotation of the nozzle shaft 19b causes rotation of the nozzle vane 19a, thereby changing the vane angle.

Now, an opening regulating part for regulating the vane angle of the nozzle vane 19a and a discharge structure of accumulated soot, according to the present invention, are now described.

As illustrated in FIG. 2 and FIG. 3, a substantially gourd-shaped lever plate 33 is attached to the drive ring 31 at one end and is connected to an end of the nozzle shaft 19b penetrating the nozzle mount 21 in the same direction as the rotation axis K.

An inner peripheral end surface of this lever plate 33 is formed in a moderately curved surface shape. The inner peripheral end surface of the lever plate 33 is configured such that, when the lever plate 33 rotates in a direction of fully opening the nozzle vane 19a, the inner peripheral end surface contacts an outer peripheral surface 41 of an inner cylinder of the bearing housing 13 to which the nozzle mount 21 is fixed. This contact part forms an opening degree regulating part 43 for regulating the angle of the nozzle vane 19a to a prescribed opening degree. In this embodiment, the opening degree regulating part 43 serves to regulate the opening degree when the nozzle vane 19a is fully open.

The opening degree regulating part at the full-closing servers by contacting the side surface of the lever plate 33 to the pin 45 illustrated in FIG. 3.

Figure 4:
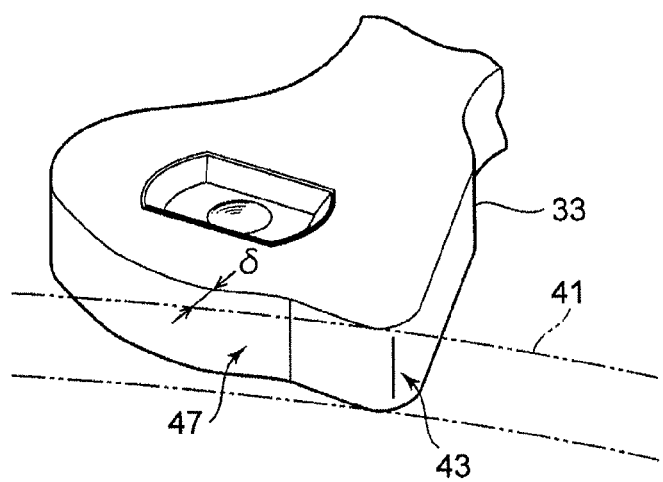
FIG. 4 is an enlarged oblique view of a discharge part of the first embodiment.

As illustrated in a dotted section of FIG. 3 and in FIG. 4, in the inner peripheral end surface of the lever plate 33 the opening angle regulating part 43 is formed such that a lower end corner of the lever plate 33 protrudes. From this opening angle regulating part 43, a discharge recess 47 is formed in a continuous manner along the circumferential direction of inner peripheral end surface of the lever plate 33 in a moving direction of the lever plate 33 to fully open the nozzle vane 19a (in the direction of arrow P in FIG. 3). This discharge recess 47 is configured such that, when the lever plate 33 rotates in the direction of contacting the outer peripheral surface 41 of the inner cylinder of the bearing housing 13, accumulated soot is swept out or pushed out by the protruding opening degree regulating part 43 and the inner peripheral end surface of the lever plate 33, so as to prevent accumulation of soot.

The discharge recess 47 may formed into a gap shape which facilitates discharging of the accumulated soot along the inner peripheral end surface of the lever plate 33. For instance, the discharge recess 47 may be configured such that gap 6 (see FIG. 4) increases along the rotational direction. Moreover, instead of the shape where the entire end surface is entirely cut off as illustrated in FIG. 4, the discharge recess 47 may be formed by multiple lines of grooves formed in the circumferential direction at the inner peripheral end surface of the lever plate 33 as long as the soot discharging effect can be obtained.

The exhaust gas passing through the turbine rotor 7 leaks to the recess 17 side of the bearing housing 13 through a sliding portion of the nozzle mount 21 and the nozzle shaft 19b, a fitting portion of the bearing housing 13 and the nozzle mount 21, and a fitting portion of a turbine back plate 18 and the nozzle mount 21 as well as the bearing hosing 13, and incidentally soot in the exhaust gas accumulates in the recess 17.

In particular, soot is easily deposited in a gap A in between the lever plate 33 and the nozzle mount 21, and in a gap B between the inner peripheral end surface of the lever plate 33 and the outer peripheral surface 41 of the inner cylinder of the bearing housing 13.

The accumulation of soot in the gap A and the gap B puts the nozzle vane 19a in the state where the nozzle vane is unable to fully open, which may result in supercharging more than needed. In this embodiment, however, at every rotation of the lever plate in the full-open direction, this rotation causes discharge of the accumulated soot by the inner peripheral end surface of the lever plate 33 and the protruding opening degree regulating part 43. Thus, it is possible to prevent increase in soot deposition in the gap B between the inner peripheral end surface of the lever plate 33 and the outer peripheral surface 41 of the inner cylinder of the bearing housing 13. As a result, it is possible to always perform the control for maximum opening in a stable manner by means of the opening degree regulating part 43.

(Second Embodiment)

Figure 5:
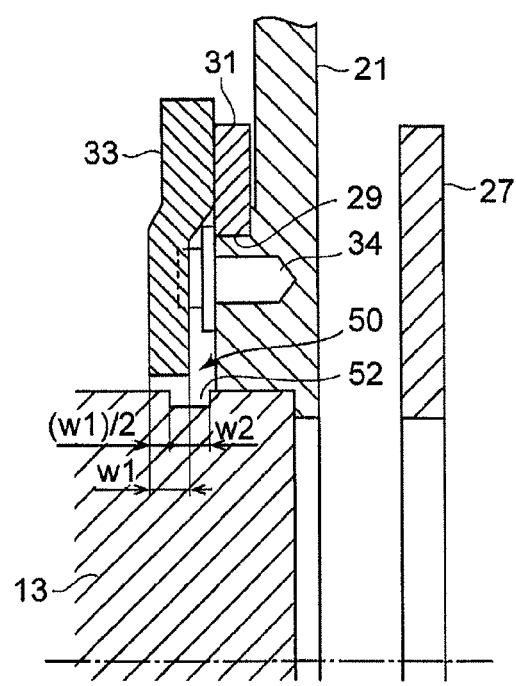
FIG. 5 is a cross-sectional view of a main part of a discharge part of a second embodiment.
Figure 8:
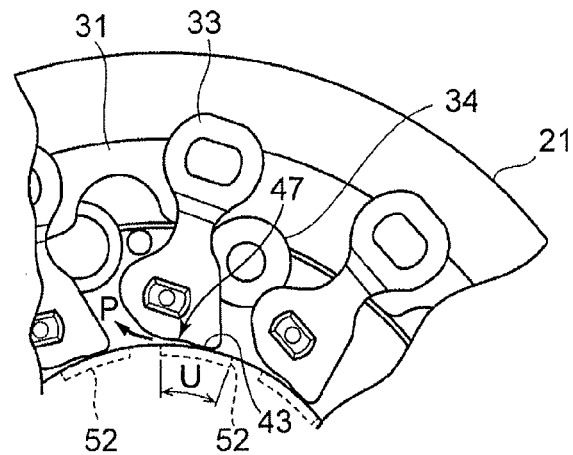
FIG. 8 is an illustration of the second embodiment.
Figure 9:
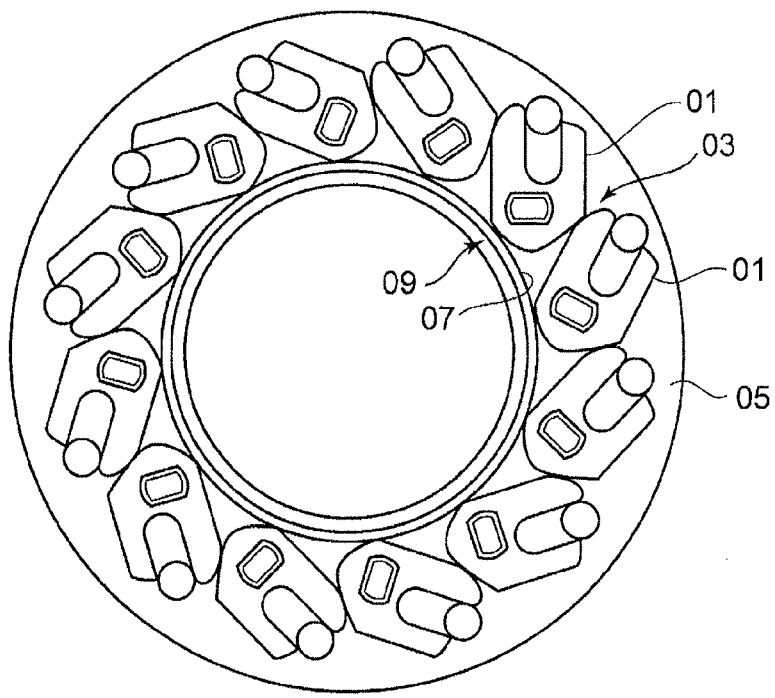
FIG. 9 is an illustration of related art.

Next, a second embodiment is described in reference to FIG. 5 and FIG. 8.

FIG. 5 is an illustration of a discharge part 50 of the second embodiment and is an enlarged cross-sectional view along a line D-D of FIG. 3.

At a cross-sectional position of the line D-D, the drive ring 31 is retained by the flange head of the rivet 34 so as not to fall from the stepped portion 29 of the nozzle mount 21. On a peripheral side of the position of this rivet 34, the opening degree regulating part 43 is formed.

As illustrated in FIG. 5, the discharge part 50 is on an inner peripheral side of the gap between the lever plate 33 and the nozzle mount 21 and is constituted by a discharge groove 52 formed in the outer peripheral surface of the inner cylinder of the bearing housing 13 along the circumferential direction. This discharge groove 52 extends in the circumferential direction of the turbine over an area, as indicated by U in FIG. 8, which is larger than a contact surface of the opening degree regulating part 43 of the lever plate 33, and also extends in an axial direction of the turbine to a substantially half position of width W1 of the contact surface of the inner peripheral end portion of the lever plate 33 as indicated by W2 in FIG. 5.

The position of the discharge groove 52 in the circumferential direction of the turbine may be formed to continue over the entire circumference, instead of a part of the circumference as indicated by U of FIG. 8.

With the above configuration of the discharge groove 52, the soot accumulating in the gap between the nozzle mount and the side surface of the inner peripheral end portion (the side surface and the end surface on the inner peripheral side) of the lever plate 33 on the nozzle mount 21 side is discharged by the discharge groove 52 in the circumferential direction of the turbine. Thus, it is possible to effectively avoid soot accumulation in the gap between the inner peripheral end portion of the lever plate 33 and the outer peripheral surface 41 of the inner cylinder of the bearing housing 31 as well as the nozzle mount 21. In the case where a sufficient size of the discharge groove is secured, the discharge recess of the lever plate as described in the first embodiment may be omitted.

In addition, as this discharge part 52 is formed in the axial direction of the turbine to a substantially half position of width W1 of the contact surface of the inner peripheral end portion of the lever plate 33, the contact surface width of the inner peripheral end surface of the lever plate 33 is reduced. As a result, it is possible to reduce the amount of soot accumulation between the inner peripheral end surface of the lever plate 33 and the outer peripheral surface 41 of the inner cylinder of the bearing housing 13.

As for the width of the discharge part 52 in the axial direction of the turbine, if the contact surface is reduced approximately more than half, this may result in increased wear of the inner peripheral end surface of the lever plate 33. This makes it difficult to accurately regulate the opening degree. Further, if the contact surface is increased approximately more than the half position, it is difficult to achieve the soot discharge effect. Therefore, the discharge groove 52 may be formed to the substantially half position of plate thickness W1 of the inner peripheral end portion of the lever plate 33 as shown in the comparison example illustrated in FIG. 8.

According to the second embodiment, the soot accumulating in the gap between the nozzle mount 21 and the side surface of the inner peripheral end portion of the lever plate 33 on the nozzle mount 21 side is discharged in the circumferential direction of the turbine by the length U of the discharge groove 52. In addition to this, by setting the contact surface side position of the width W2 of the discharge groove 52 in the axial direction of the turbine to the position which is approximately half position in the plate thickness W1 of the lever plate, it is possible to reduce the amount of soot accumulation between the inner peripheral end surface of the lever plate 33 and the outer peripheral surface 41 of the inner cylinder of the bearing housing 13 and also facilitate discharge of the soot accumulating in the discharge groove 52 in the axial direction of the turbine. As a result, soot which easily accumulates near the opening degree regulating part 43 of the inner peripheral end portion of the lever plate 33 can be effectively discharged.

(Third Embodiment)

Figure 6:
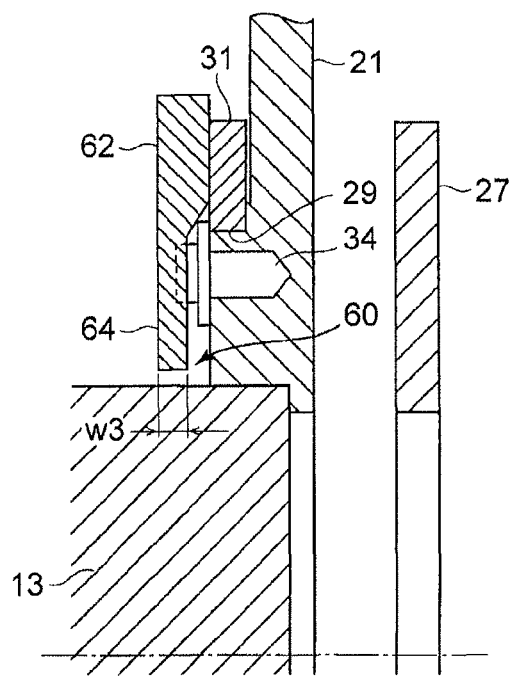
FIG. 6 is a cross-sectional view of a main part of a discharge part of a third embodiment.

Next, a third embodiment is described in reference to FIG. 6.

FIG. 6 is an illustration of a discharge part 60 according to the third embodiment and is an enlarged cross-sectional view along the line D-D of FIG. 3.

Figure 7:
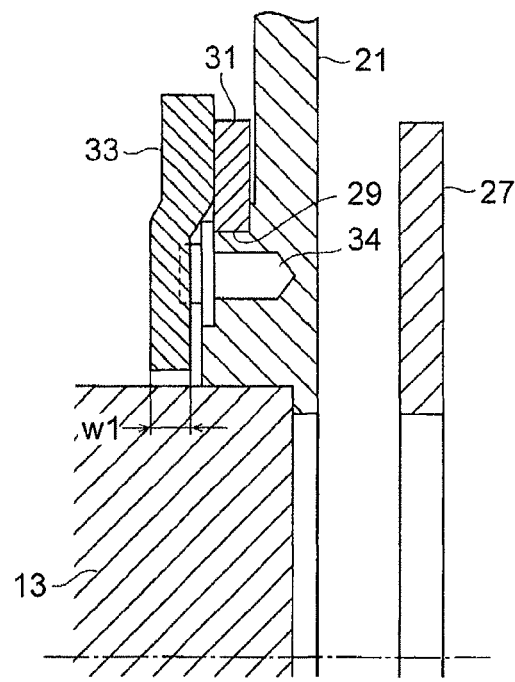
FIG. 7 is a cross-sectional view of a main part of a discharge part of a comparison example.

As illustrated in FIG. 6, the inner peripheral end portion of the discharge part 60 is reduced in thickness to a plate thickness W3, compared to the plate thickness W1 in the comparison case of FIG. 7. Specifically, the discharge part 60 is constituted by a thin-plate part 64 whose thickness W3 at the inner peripheral end portion of the lever plate 62 is reduced compared to other section of the inner peripheral end portion of the lever plate 62, i.e. an end portion of the lever plate 62 to which the drive ring 31 is mounted.

According to the third embodiment, with reduced contact surface of the lever plate 62 with respect to the outer peripheral surface 41 of the inner cylinder of the bearing housing 13, it is possible to reduce the amount of soot accumulation between the inner peripheral end surface of the lever plate 62 and the outer peripheral surface 41 of the inner cylinder of the bearing housing 13 and also facilitate discharge of the soot in the axial direction of the turbine by means of the width W3 of the thin-plate part from the gap between the nozzle mount 21 and the side surface of the inner peripheral end portion of the lever plate 62 on the nozzle mount 21 side.

As a result, soot which easily accumulates near the opening degree regulating part 43 of the inner peripheral end portion of the lever plate 33 can be effectively discharged.

Similarly to the second embodiment, the width W3 needs to be set by taking into consideration both the wear of the inner peripheral end surface of the lever plate 62 and the performance of soot discharge from the contact surface.

The first through third embodiments that are described above may be used independently or may be appropriately combined.

INDUSTRIAL APPLICABILITY

According to the present invention, by forming the discharge part in at least one of the inner peripheral end portion of the connecting member, the nozzle mount and the housing so as to discharge soot accumulating in the gap between the inner peripheral end portion of the connecting member and at least one of the nozzle mount and the housing, soot in the exhaust gas is unlikely to accumulate in the gap between the inner peripheral end portion of the connecting member and at least one of the nozzle mount and the housing. Therefore, it is suitable for use in the opening degree regulating structure for the variable nozzle mechanism as well as the variable displacement turbocharger.

The invention claimed is:

1. An opening degree regulating structure for a variable nozzle mechanism, the structure comprising:
   the variable nozzle mechanism which comprises:
      a plurality of variable nozzle vanes arranged along a circumferential direction of a turbine and having nozzle shafts that are rotatably supported by a nozzle mount, the nozzle mount being fixed in a housing;
      an annular nozzle drive member which is configured to be rotatable around an axis of the turbine by an actuator so as to rotate the nozzle shafts of the nozzle vanes; and
      connecting members which are equal in number to the nozzle vanes, the connecting members connecting the nozzle shafts of the nozzle vanes to the nozzle drive member and being configured to be pivotable by the nozzle drive member so as to rotate the nozzle shafts;
   an opening degree regulating part which is configured to regulate an opening angle of the nozzle vane by contacting an outer peripheral surface of an inner cylinder of the housing and an inner peripheral end surface of the connecting member to each other, when the connecting members rotate in a direction to fully open the nozzle vanes, the nozzle mount being fixed to the inner cylinder of the housing, the opening degree regulating part comprising a lower end protruding corner of the inner peripheral end surface of the connecting member; and
   a discharge part formed in at least one of an inner peripheral end portion of the connecting member, the nozzle mount or the housing in a vicinity of the opening degree regulating part so as to discharge soot accumulating in a gap between the inner peripheral end portion of the connecting member and at least one of the nozzle mount and the housing.

2. The opening degree regulating structure for the variable nozzle mechanism, according to claim 1,
   wherein the discharge part is constituted by a discharge recess formed in the inner peripheral end surface of the connecting member, the discharge recess being configured to discharge accumulated soot by the inner peripheral end surface of the connecting member at rotation of the connecting member in a direction of contacting the housing.

3. A variable displacement turbocharger comprising,
   the opening degree regulating structure for the variable nozzle mechanism which is described in claim 2.

* * * * *